United States Patent
Kim et al.

(10) Patent No.: US 9,457,713 B2
(45) Date of Patent: Oct. 4, 2016

(54) LED ILLUMINATOR IN HOOD OF VEHICLE

(75) Inventors: Young Pil Kim, Ansan-si (KR); Byeong Gil An, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 43 days.

(21) Appl. No.: 13/817,514

(22) PCT Filed: Oct. 1, 2010

(86) PCT No.: PCT/KR2010/006724
§ 371 (c)(1),
(2), (4) Date: Feb. 18, 2013

(87) PCT Pub. No.: WO2012/023656
PCT Pub. Date: Feb. 23, 2012

(65) Prior Publication Data
US 2013/0155709 A1   Jun. 20, 2013

(30) Foreign Application Priority Data

Aug. 18, 2010   (KR) .................. 10-2010-0079762

(51) Int. Cl.
*B60Q 11/00* (2006.01)
*B60Q 3/06* (2006.01)

(52) U.S. Cl.
CPC ........................... *B60Q 3/06* (2013.01)

(58) Field of Classification Search
CPC ...... F21S 8/028; F21S 48/115; F21S 48/147; F21S 48/1742; F21S 48/22; B60Q 3/06; B60Q 1/302; F21W 2101/08
USPC ..................... 362/496, 249.12, 94
See application file for complete search history.

(56) References Cited

U.S. PATENT DOCUMENTS

| | | | | |
|---|---|---|---|---|
| 3,692,992 A | * | 9/1972 | Bain et al. | 362/496 |
| 4,197,573 A | * | 4/1980 | Thatch | 362/241 |
| 4,316,239 A | * | 2/1982 | Cass et al. | 362/155 |
| 4,516,191 A | * | 5/1985 | Moriyama et al. | 362/527 |
| 4,628,417 A | * | 12/1986 | Kaminski et al. | 362/485 |
| 5,504,287 A | * | 4/1996 | Cable | 200/61.52 |
| 5,798,912 A | * | 8/1998 | Brown et al. | 362/496 |
| 6,422,725 B1 | * | 7/2002 | Fong | 362/500 |

(Continued)

FOREIGN PATENT DOCUMENTS

| | | |
|---|---|---|
| CN | 201016436 | 2/2008 |
| CN | 201129655 | 10/2008 |

(Continued)

OTHER PUBLICATIONS

Merriam-Webster, "Hood", Oct. 19, 2014, http://www.merriam-webster.com/dictionary/hood.*
International Search Report issued for related International Application No. PCT/KR2010/006724, dated Oct. 4, 2011.
Chinese Office Action issued Aug. 19, 2014 in Application No. 201080068604.X.

*Primary Examiner* — Evan Dzierzynski
*Assistant Examiner* — Matthew Peerce
(74) *Attorney, Agent, or Firm* — H.C. Park & Associates, PLC

(57) ABSTRACT

Herein, there is disclosed an LED illuminator installed to illuminate an inner space of a hood of a vehicle when the hood is open. The LED illuminator comprises a protection frame positioned in an inner space of the hood; and an LED module having a light emitting portion, wherein the light emitting portion is installed to be concealed into and exposed to the outside of the protection frame.

11 Claims, 3 Drawing Sheets

(56) References Cited

U.S. PATENT DOCUMENTS

| | | | |
|---|---|---|---|
| 6,843,589 B1* | 1/2005 | Dhillon et al. | 362/527 |
| 6,935,327 B1* | 8/2005 | Williams et al. | 126/39 BA |
| 7,222,620 B2* | 5/2007 | Wolter et al. | 126/39 BA |
| 7,705,720 B2* | 4/2010 | Jachmann | 340/473 |
| 8,348,464 B2* | 1/2013 | McDermott | 362/249.12 |
| 2006/0132047 A1 | 6/2006 | Newton | |
| 2008/0239709 A1* | 10/2008 | Rapeanu et al. | 362/147 |
| 2009/0059594 A1* | 3/2009 | Lin | 362/294 |
| 2012/0182749 A1* | 7/2012 | MacGregor | 362/486 |

FOREIGN PATENT DOCUMENTS

| | | | | |
|---|---|---|---|---|
| JP | 2007-229261 | | 9/2007 | |
| KR | 1997-0005901 | | 2/1997 | |
| KR | 20090000043 | * | 6/2007 | G09F 13/22 |
| KR | 20-2009-0000043 | | 1/2009 | |
| KR | 2009-0000043 | * | 1/2009 | G09F 13/22 |

* cited by examiner

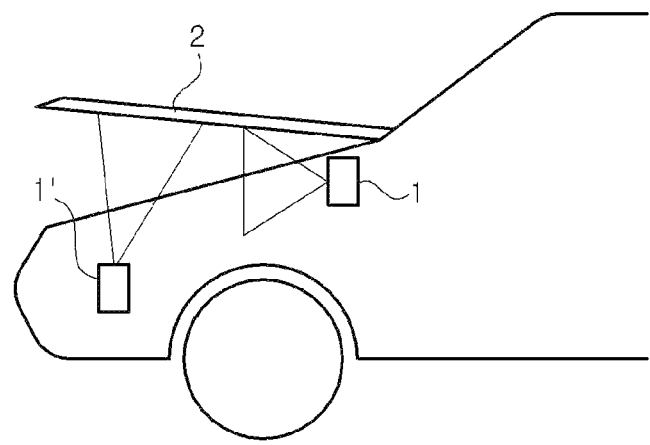
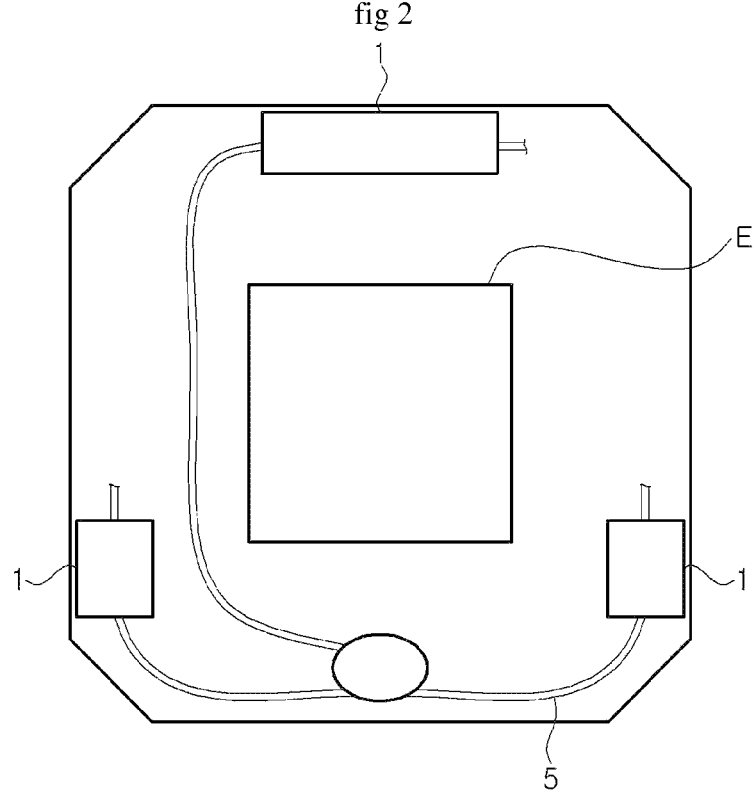

LED ILLUMINATOR IN HOOD OF VEHICLE

CROSS-REFERENCE TO RELATED APPLICATIONS

This application is the National Stage Entry of International Application No. PCT/KR2010/006724, filed on Oct. 1, 2010, and claims priority to Korean Patent Application No. 10-2010-0079762, filed on Aug. 18, 2010, which are hereby incorporated by reference for all purposes as if fully set forth herein.

BACKGROUND

1. Field

The present invention relates to a light emitting diode (LED) illuminator in a hood of a vehicle, and more particularly, to an LED illuminator in a hood of a vehicle which may have high safety and reliability against variable unfavorable conditions within the hood of the vehicle.

2. Discussion of the Background

Generally, a vehicle is equipped with a hood in order to open/close an engine room and/or a trunk positioned at a front portion and/or a rear portion of a vehicle body. Particularly, various components including an engine of a vehicle are arranged in a space under the hood in which an engine room is defined. The hood needs to be frequently opened to check and/or repair the various components including the engine. At this time, it is difficult to check various the components of the vehicle positioned within the hood with the naked eye at night or in a relatively dark place. As such, if any illuminator is installed to the hood, the engine room may be more easily checked after the hood is opened during the breakdown of the vehicle.

However, there are various limitations to install an illuminator within the hood of the vehicle, and more particularly, in the engine room or its surroundings. Since vibration and heat may be heavily generated in the engine room, it is considerably dangerous to install the conventional illuminator such as a cold cathode fluorescent lamp (CCFL) within the hood. In addition, the inner space of the hood, i.e., the engine room, is violently polluted due to oil stains, dusts and the like and has difficulty in cleaning due to its intrinsic characteristics. As such, even if an illuminator is installed in the engine room, it is difficult to constantly maintain the performance of the illuminator due to the pollution.

SUMMARY

Accordingly, an object of the present invention is to provide an LED illuminator in a hood of a vehicle which has high safety and reliability against various unfavorable conditions within the hood of the vehicle.

Another object of the present invention is to provide an LED illuminator in a hood of a vehicle capable of having high safety and reliability against various unfavorable conditions such as vibrations and/or high temperature conditions within the hood of the vehicle and further capable of constantly maintaining the performance of the LED illuminator by exposing the LED illuminator to pollutants such as oil stains, dusts, and the like only during the open period of the hood and/or the illumination operation of the LED illuminator itself.

According to an aspect of the present invention for achieving the objects, there is provided a LED illuminator installed to illuminate an inner space of a hood of a vehicle when the hood is open. The LED illuminator comprises a protection frame positioned in an inner space of the hood; and an LED module having a light emitting portion, wherein the light emitting portion is installed to be concealed into and exposed to the outside of the protection frame.

According to an embodiment, the LED module is rotatably installed to the protection frame through a hinge.

According to another embodiment, the LED module is rotated about the hinge to be concealed into and exposed to the outside of the protection frame.

According to still another embodiment, a coolant line is arranged in the inner space of the hood, and the LED module is arranged adjacent to the coolant line.

An LED illuminator in the hood of the vehicle according to the present invention has an advantage in that the LED illuminator has high safety and reliability against various unfavorable conditions such as vibrations and/or high temperature conditions within the hood of the vehicle and may constantly maintain the performance of the LED illuminator by exposing the LED illuminator to pollutants such as oil stains, dusts, and the like only during the open period of the hood and/or the illumination operation of the LED illuminator itself.

BRIEF DESCRIPTION OF THE DRAWINGS

FIG. 1 is a schematic view showing an LED illuminator for a hood of a vehicle, which is installed in the hood of the vehicle, according to an embodiment of the present invention.

FIG. 2 is a schematic view showing a front space of a vehicle body, which is opened and/or closed by the hood, according to the embodiment of the present invention.

DETAILED DESCRIPTION OF THE ILLUSTRATED EMBODIMENTS

Figure 3:
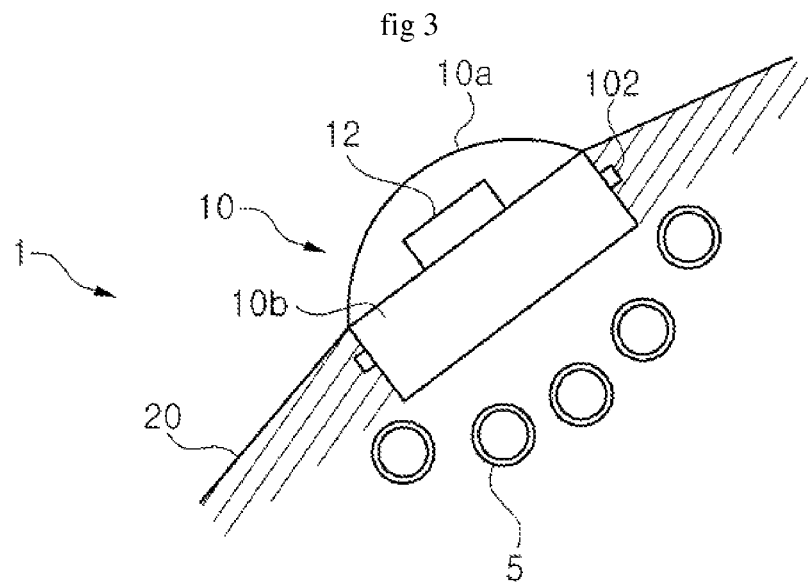
FIG. 3 is a view showing a state in which the LED illuminator according to the embodiment of the present invention operates when the hood is opened.

Hereinafter, preferred embodiments of the present invention will be described in detail with reference to the accompanying drawings. The following embodiments are provided only for illustrative purposes so that those skilled in the art can fully understand the spirit of the present invention. Therefore, the present invention is not limited to the following embodiments but may be implemented in other forms. In the drawings, the widths, lengths, thicknesses and the like of elements may be exaggerated for convenience of illustration. Like reference numerals indicate like elements throughout the specification and drawings.

FIG. 1 is a schematic view showing an LED illuminator for a hood of a vehicle, which is installed in the hood of the vehicle, according to an embodiment of the present invention.

As shown in FIG. 1, when a hood 2 has been opened, an LED illuminator 1 is arranged to brightly illuminate an engine room and its surroundings which are positioned in the hood 2. One LED illuminator 1 is arranged at the rear side of the engine room in the hood 2, i.e., a position relatively adjacent to the driver's seat to illuminate the front side of the engine room. Another LED illuminator 1' may be arranged to more broadly illuminate other regions which would not be illuminated by the aforementioned LED illuminator 1.

FIG. 2 schematically shows the inner space of the hood 2, i.e., a front space of a vehicle body which is opened and/or closed by the hood 2.

Referring to FIG. 2, a plurality of LED illuminators 1 are arranged around an engine room E which is opened by opening the hood 2 (see FIG. 1). As such, the LED illuminators 1 may almost completely illuminate the engine and its surrounding components. At this time, coolant lines 5 are arranged around the LED illuminators 1, so that the coolant lines 5 absorb heat from the LED illuminators 1 to thereby prevent the LED illuminators 1 from being deteriorated in view of its performance due to the heat. At this time, the coolant lines 5 which would be installed to cool the engine or other components in the vehicle body are used as the coolant lines 5 as they are.

Figure 4:
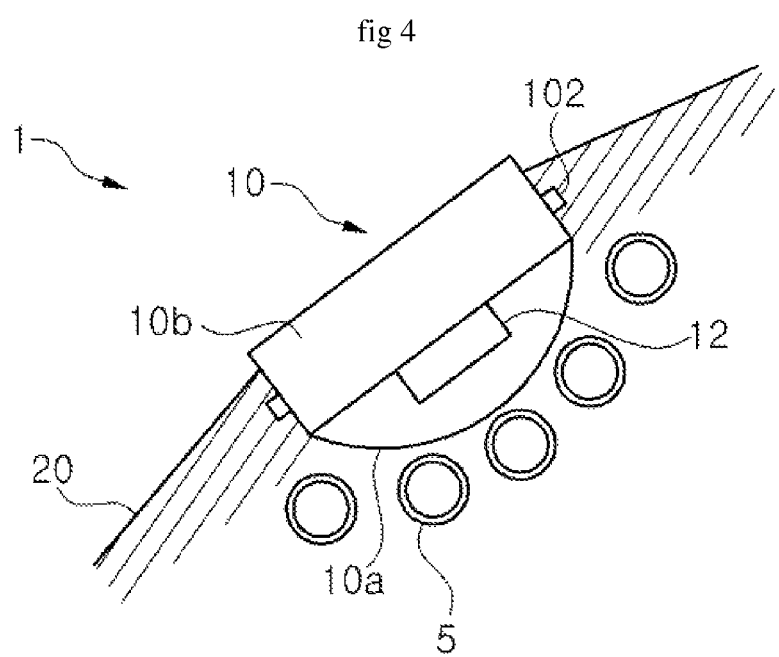
FIG. 4 is a view showing a state in which the LED illuminator according to the embodiment of the present invention does not operate when the hood is closed.

FIG. 3 is a view showing a state in which the LED illuminator 1 operates when the hood is opened, while FIG. 4 is a view showing a state in which the LED illuminator 1 does not operate when the hood is closed.

Referring to FIGS. 3 and 4, the LED illuminator 1 according to this embodiment includes an LED module 10 and a protection frame 20 to which the LED module 10 is installed. The protection frame 20 is positioned in the hood 2 of the vehicle, and may be a portion of a vehicle body frame. The LED module 10 includes a LED device 12 therein, wherein the LED device 12 may be an LED package or chip. The LED module 10 is divided into a light emitting portion 10a and a light non-emitting portion 10b depending on whether the light from the LED device 12 is emitted therethrough. The light emitting portion 10a may have a light transmittable lens, a light transmittable cover or a light transmittable shield, while the light non-emitting portion 10b may have a light non-transmittable cover or housing. Further, the light non-emitting portion 10b may have a heat sink, a PCB, and the like therein. In this embodiment, a hinge 102 is provided on an outside of the light non-emitting portion 10b, so that the LED module 10 may be rotated about the hinge 102. The rotation may cause the light emitting portion 10a to be exposed to the outside of the protection frame 20 or the light emitting portion 10a to face the inside of the protection frame 20, thereby protecting the light emitting portion 10a from oil stains or dusts in the engine room.

Referring to FIG. 3, the light emitting portion 10a of the LED module 10 is exposed to the outside of the protection frame 20. In the position as shown in FIG. 3, the hood 2 (see FIG. 1) of the vehicle is opened, so that the LED module 10 provides a bright illumination toward the engine room opened by the hood 2. The LED module 10 may be rotated from the position shown in FIG. 3 to the position shown in FIG. 4. In this case, the light emitting portion 10a of the LED module 10 is accommodated in the protection frame 20 and the light non-emitting portion 10b opposite to the light emitting portion 10a is exposed to the outside of the protection frame 20. By concealing the light emitting portion 10a of the LED module 10 into the protection frame 20, as shown in FIG. 4, when the hood 2 has not been opened, so that the light emitting portion 10a of the LED module 10 can be easily protected from oil stains, and the like. Since a time period in which the hood is open is extremely small compared to a time period in which the hood is closed, only the aforementioned construction could cause the light emitting portion 10a, which serves as a primary portion of the LED illuminator, to be effectively protected from oil stains and/or dusts. The movement of the LED module 10 for the selective exposure of the light emitting portion 10 may be mechanically or manually realized. Referring to FIGS. 3 and 4, when the illumination operation of the LED module 10 is realized, the coolant lines 5 is adjacent to the LED module 10, and more particularly, to the light non-emitting portion 10b.

Figure 5:
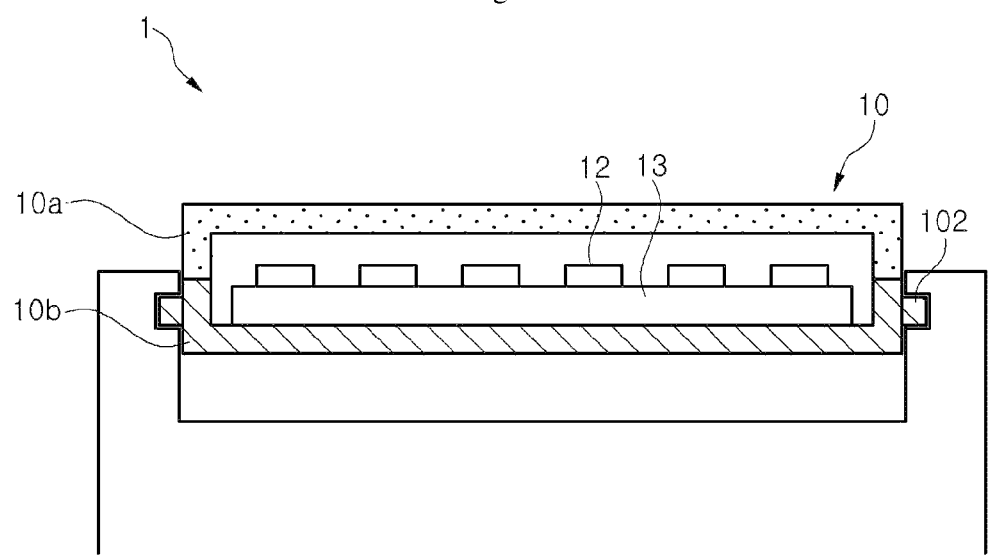
FIG. 5 is a view showing a preferred example of an LED illuminator according to another embodiment of the present invention.

FIG. 5 shows an LED illuminator according to another embodiment of the present invention. Referring to FIG. 5, the LED module 10 includes an elongate fluorescent lamp type of a housing in which the light emitting portion 10a and the light non-emitting portion 10b are defined as upper and lower portions of the housing, respectively. An elongate PCB 13 and a plurality of LED devices 12 which are longitudinally aligned on the elongate PCB 13 are arranged in the housing. Hinges 102 and 102 are installed to both right and left sides of the light non-emitting portion 10b. The hinges 102 and 102 are supported by shaft holes in the protection frame 20 to rotatably support the LED module 10. As the LED module 10 is rotated about the aforementioned hinges 102 and 102, the light emitting portion 10a of the LED module 10 can be concealed into and/or exposed to the outside of the protection frame 20. When the light emitting portion 10a is exposed to the outside of the protection frame 20, the light emitting portion 10a brightly illuminates the inner space in the hood. When the light emitting portion 10a is concealed into the protection frame 20 and thus the light non-emitting portion 10b is exposed to the outside, the light emitting portion 10a can be protected from oil stains and/or dusts.

The invention claimed is:

1. A light emitting device (LED) illuminator configured to illuminate an inner space enclosed by a vehicle hood, the LED illuminator comprising:
   a protection frame configured to be arranged in an area enclosed by the hood; and
   an LED module movably connected to the protection frame, the LED module comprising a light emitting portion and a light non-emitting portion,
   wherein the light emitting portion is configured to be concealed into the protection frame in a first position and exposed to the outside of the protection frame in a second position,
   wherein the light emitting portion and the light non-emitting portion are disposed opposite each other around a hinged axis, and
   wherein the light emitting portion is configured to be rotated with respect to the protection frame from the first position to the second position in response to opening of the hood, and rotated with respect to the protection frame from the second position to the first position in response to closing of the hood.

2. The LED illuminator as claimed in claim 1, wherein the LED module is rotatably connected to the protection frame through the hinged axis, and either the light emitting portion or the light non-emitting portion is exposed to the outside of the protection frame according to the rotation of the LED module about the hinged axis.

3. The LED illuminator as claimed in claim 2, wherein a coolant line is arranged in the area enclosed by the hood, and the LED module is arranged adjacent to the coolant line.

4. The LED illuminator as claimed in claim 3, wherein the light emitting portion is configured to be rotated to be accommodated in the protection frame when the hood is closed.

5. The LED illuminator as claimed in claim 4, wherein the light emitting portion is arranged between the light non-emitting portion and the coolant line.

6. The LED illuminator as claimed in claim 1, wherein a coolant line is arranged in the area enclosed by the hood, and the LED module is arranged adjacent to the coolant line.

7. The LED illuminator as claimed in claim 1, wherein the light non-emitting portion is arranged between the light emitting portion and the coolant line.

8. A light emitting device (LED) illuminator configured to illuminate an inner space, the LED illuminator comprising:
 a protection frame arranged in the inner space, the inner space enclosed by a vehicle hood; and
 an LED module rotatably connected to the protection frame, the LED module comprising a light emitting portion and a light non-emitting portion,
 wherein the light emitting portion is configured to alternately be concealed in the protection frame in a first position and exposed to the outside of the protection frame in a second position,
 wherein the light emitting portion and the light non-emitting portion are disposed opposite each other around a hinged axis, and
 wherein the light emitting portion is configured to be rotated with respect to the protection frame from the first position to the second position in response to opening of the hood, and rotated with respect to the protection frame from the second position to the first position in response to closing of the hood.

9. A light emitting device (LED) illuminator arranged in an inner space enclosed by a vehicle hood, comprising:
 a protection frame; and
 an LED module rotatably connected to the protection frame, the LED module comprising:
  a housing comprising a first part and a second part, and
  a light emitting portion and a light non-emitting portion,
 wherein the housing first part is configured to alternately be concealed in the protection frame in a first position and exposed to the outside of the protection frame in a second position,
 wherein the light emitting portion and the light non-emitting portion are disposed opposite each other around a hinged axis,
 wherein the light emitting portion is configured to be rotated with respect to the protection frame from the first position to the second position in response to opening of the hood, and rotated with respect to the protection frame from the second position to the first position in response to closing of the hood.

10. The LED illuminator as claimed in claim 9, wherein the housing second part comprises hinges rotatably connected to the protection frame.

11. The LED illuminator as claimed in claim 10, wherein the LED module further comprises a printed circuit board (PCB) and a plurality of LEDs arranged on the PCB, and
 wherein the PCB and LEDs are arranged inside the housing.

* * * * *